United States Patent
Karani et al.

(10) Patent No.: US 10,459,067 B2
(45) Date of Patent: *Oct. 29, 2019

(54) CEILING-MOUNTED RFID-ENABLED TRACKING

(71) Applicant: QUAKE GLOBAL, INC., San Diego, CA (US)

(72) Inventors: Chetan Shantilal Karani, Chantilly, VA (US); Luke Christopher Waidmann, Alexandria, VA (US); Walker Edward Bolger-Kumm, Arlington, VA (US); Ronan Wisdom, Ashburn, VA (US)

(73) Assignee: QUAKE GLOBAL, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,237

(22) Filed: Dec. 11, 2017

(65) Prior Publication Data
US 2018/0196121 A1 Jul. 12, 2018

Related U.S. Application Data

(63) Continuation of application No. 15/237,400, filed on Aug. 15, 2016, now Pat. No. 9,841,492, which is a
(Continued)

(51) Int. Cl.
*G01S 5/02* (2010.01)
*G01S 3/38* (2006.01)
(Continued)

(52) U.S. Cl.
CPC .............. *G01S 5/0294* (2013.01); *G01S 3/38* (2013.01); *G01S 13/878* (2013.01);
(Continued)

(58) Field of Classification Search
CPC ......... G06K 7/0095; G06K 2017/0045; G06K 7/10366; G06K 7/10009; G06K 7/0008;
(Continued)

(56) References Cited

U.S. PATENT DOCUMENTS

| 2006/0092014 A1* | 5/2006 | Onderko | G06K 7/10336 |
| | | | 340/539.13 |
| 2007/0200707 A1* | 8/2007 | Sweeney, II | G06K 7/0095 |
| | | | 340/572.7 |

(Continued)

*Primary Examiner* — Mirza F Alam
(74) *Attorney, Agent, or Firm* — Procopio, Cory, Hargreaves & Savitch LLP

(57) ABSTRACT

Systems and methods for tracking a subject using radio-frequency identification (RFID). In an embodiment, an antenna array comprising a plurality of articulating brackets and a plurality of antennas is provided. Each of the articulating brackets is configured to move one of the plurality of antennas into a plurality of positions, and each of the antennas is configured to receive a RFID signal. In addition, a processor receives RFID data based on RFID signals received by the antennas of the antenna array, and determines a trajectory of a subject based on the RFID data. Based on the determined trajectory of the subject, the processor controls one or more of the articulating brackets to move one or more of the antennas into a position to track the subject.

18 Claims, 5 Drawing Sheets

Related U.S. Application Data continuation of application No. 14/189,883, filed on Feb. 25, 2014, now Pat. No. 9,418,260.

(60) Provisional application No. 61/768,924, filed on Feb. 25, 2013.

(51) Int. Cl.
*G01S 13/87* (2006.01)
*H01Q 1/22* (2006.01)
*H01Q 21/06* (2006.01)
*G01S 11/06* (2006.01)

(52) U.S. Cl.
CPC ........... *H01Q 1/2216* (2013.01); *H01Q 21/06* (2013.01); *G01S 11/06* (2013.01)

(58) Field of Classification Search
CPC ............ G06K 7/10336; G08B 13/2474; G08B 13/2417; G08B 13/2462; G06Q 10/08; G06Q 10/087; G06Q 50/28; H01Q 1/088
See application file for complete search history.

(56) References Cited

U.S. PATENT DOCUMENTS

| | | | |
|---|---|---|---|
| 2007/0252701 A1* | 11/2007 | Berry | G06K 7/10336 340/572.7 |
| 2013/0057390 A1* | 3/2013 | Watt | G06K 19/0717 340/10.1 |
| 2013/0099898 A1* | 4/2013 | Bloy | G01S 5/0215 340/10.1 |
| 2014/0361077 A1* | 12/2014 | Davidson | G06Q 10/08 235/385 |

* cited by examiner

CEILING-MOUNTED RFID-ENABLED TRACKING

RELATED APPLICATIONS

This application is a continuation of U.S. patent application Ser. No. 15/237,400, filed 15 Aug. 2016, which is a continuation of U.S. patent application Ser. No. 14/189,883, filed 25 Feb. 2014, which claims priority to U.S. Provisional Patent App. No. 61/768,924, filed 25 Feb. 2013, each of which is hereby incorporated herein by reference in its entirety.

BACKGROUND

Field of the Invention

The embodiments described herein are generally directed to radio frequency identification (RFID) tracking apparatuses, and, more particularly, to methods and apparatuses for reading and tracking transponders associated with a subject (e.g., an object, human, animal, etc.), using ceiling-mounted and/or floor-mounted RFID-enabled tracking apparatuses.

Description of the Related Art

The technique of identifying objects using radio-frequency communications has been eponymously called radio-frequency identification (RFID). RFID systems have been employed in an increasingly wide range of applications such as retail supply chain, postal logistics, healthcare, manufacturing, retail stores, and airport baggage tracking. In retail supply chain applications, RFID has been used to track and trace goods throughout the supply chain, automate the receipt of pallets of shipments at distribution centers, increase shipping accuracy of goods from distribution centers (DCs) to stores, and manage inventory throughout the supply chain. In postal logistics RFID has been used to monitor the quality of service of postal shipments for international and national mail systems. For instance, a global postal organization has deployed RFID to over forty countries around the world (and increasing) to measure and monitor quality of service of mail delivered between those countries. In healthcare, RFID is being used for asset and resource management, as well as patient and staff tracking for improving patient flow within hospitals. In airports, specifically baggage tracking, RFID is being used as a replacement to barcode-based systems for quicker, more secure, and more accurate transfer of bags to improve the overall baggage handling rate.

Accordingly, RFID systems have been increasingly employed in diverse applications to facilitate the identification and tracking of merchandise, personnel, and other items and/or individuals that need to be reliably monitored and/or controlled within a particular environment. The introduction of RFID into these application has resulted in more secure, efficient, and accurate systems.

SUMMARY

In an embodiment, an apparatus for tracking a subject using RFID is disclosed. The apparatus comprises: an antenna array comprising a plurality of articulating brackets and a plurality of antennas, wherein each of the plurality of articulating brackets is configured to move a corresponding one of the plurality of antennas into a plurality of positions, and wherein each of the plurality of antennas is configured to receive a RFID signal; and at least one processor that receives RFID data based on one or more RFID signals received by one or more of the plurality of antennas of the antenna array, determines a trajectory of a subject based on the RFID data, and, based on the determined trajectory of the subject, controls one or more of the plurality of articulating brackets of the antenna array to move one or more of the plurality of antennas into a position to track the subject.

In another embodiment, a method for tracking a subject using an antenna array comprising a plurality of articulating brackets and a plurality of antennas is disclosed, wherein each of the plurality of articulating brackets is configured to move a corresponding one of the plurality of antennas into a plurality of positions, and wherein each of the plurality of antennas is configured to receive a radio-frequency identification (RFID) signal. The method comprises using at least one hardware processor to: receive RFID data based on one or more RFID signals received by one or more of the plurality of antennas of the antenna array; determine a trajectory of a subject based on the RFID data; and, based on the determined trajectory of the subject, control one or more of the plurality of articulating brackets of the antenna array to move one or more of the plurality of antennas into a position to track the subject.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In some embodiments, a tracking apparatus can be used to obtain information from a RFID-enabled subject such as, for example, an object, human, animal, etc. In some embodiments, such a tracking apparatus can be used to track the subject. For example, the tracking apparatus can be used to track a medical instrument that can potentially be moved within a hospital building. In other embodiments, such a tracking apparatus can be used to track, and further monitor and/or control activities or movements of the subject. For example, the tracking apparatus can be used to monitor activities and movements of a patient, thereby facilitating a response to and care for the patient in a timely manner.

Figure 3:
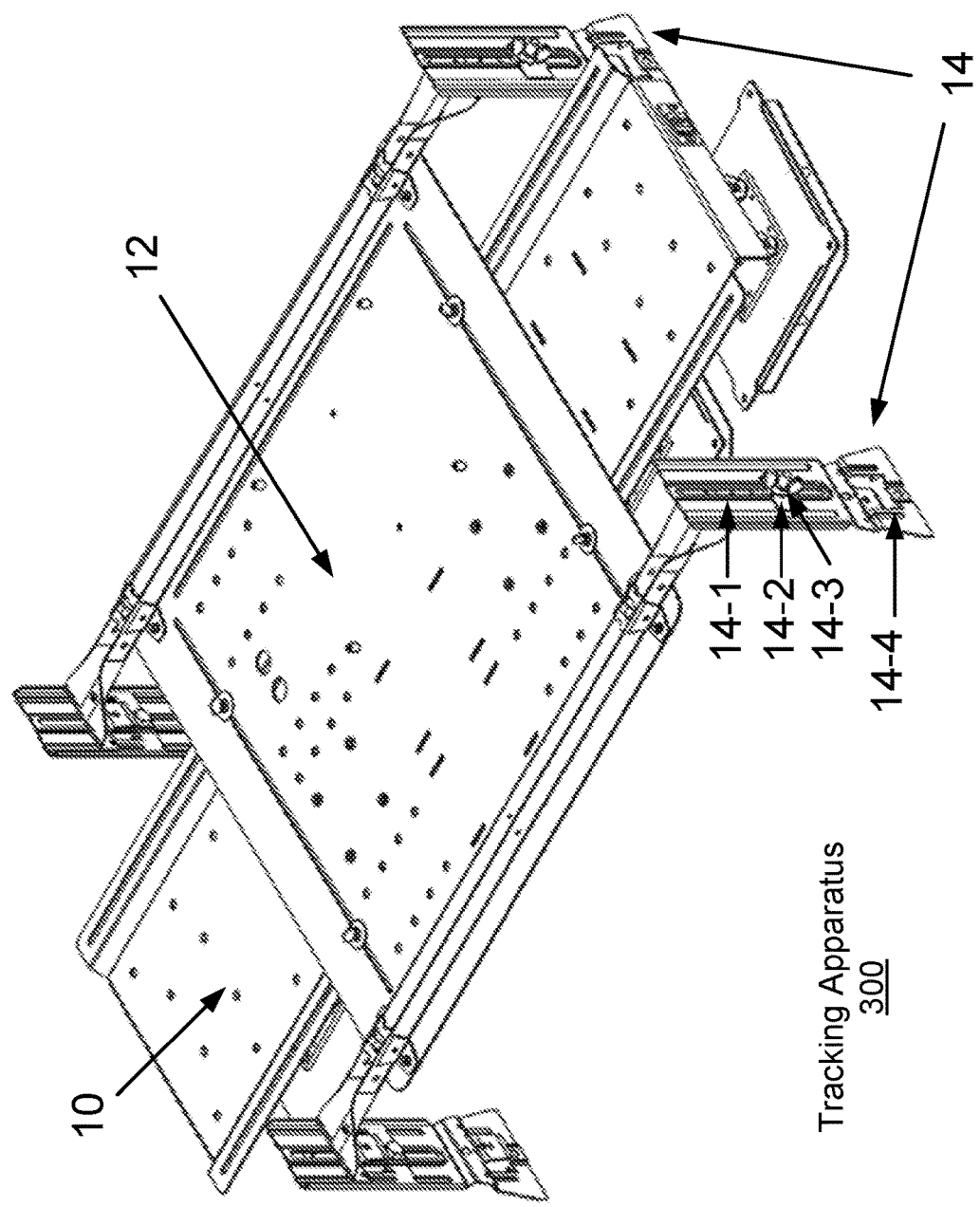
FIG. 3 is an assembly view (a top perspective view) of a tracking apparatus, according to an embodiment.
Figure 4:
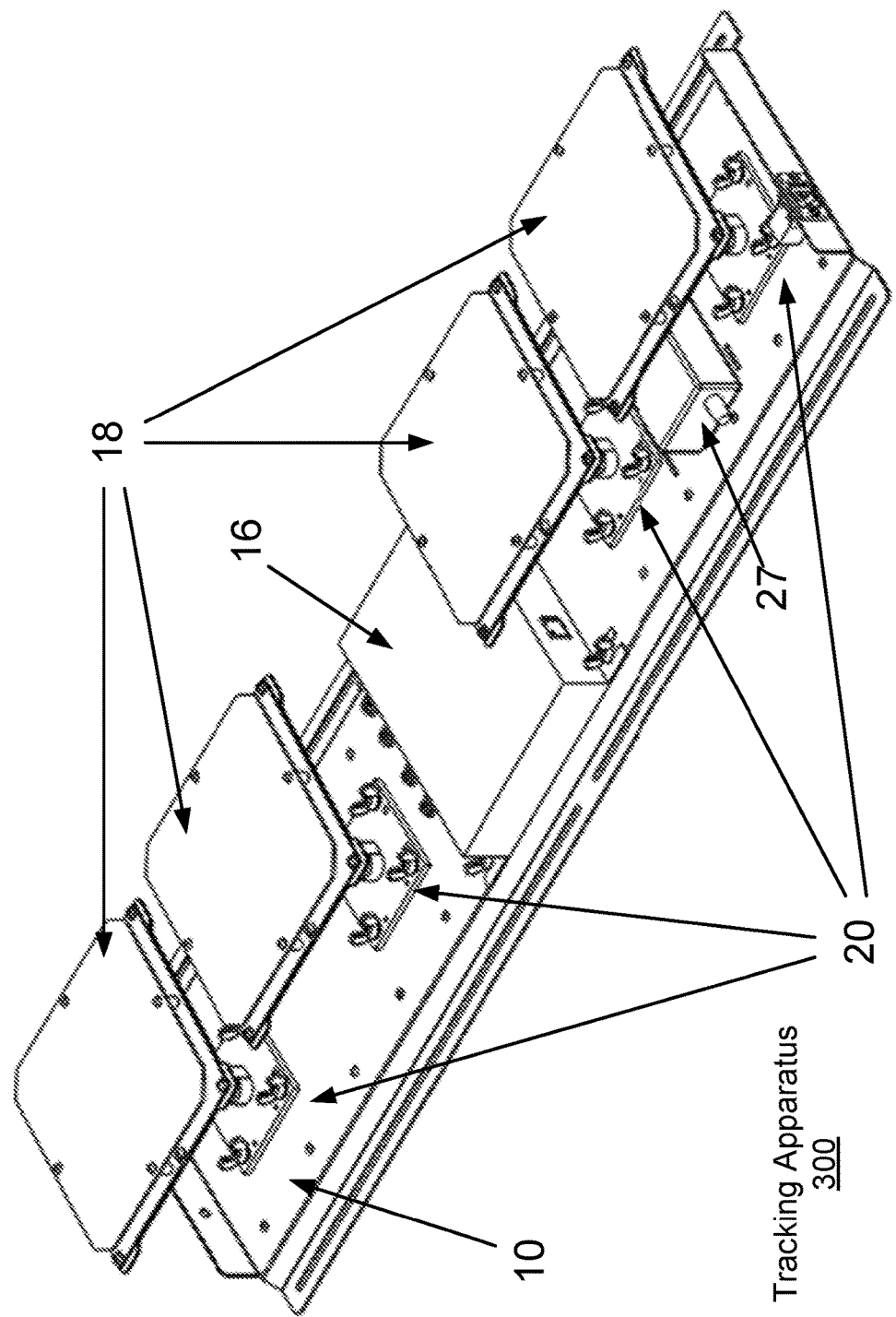
FIG. 4 is a view of the adjustable bottom panel, including the automatic identification (Auto ID) system of the tracking apparatus in FIG. 3, according to an embodiment.

As shown and described with respect to FIG. 4, a tracking apparatus can include a RFID reader, antenna array, and one or more sensors, indicators, and/or communication devices. As shown and described with respect to FIGS. 3-5, such a tracking apparatus can be mounted on or in a ceiling (e.g., above or below a ceiling). In other embodiments, a tracking apparatus, similar or identical to the ones shown and described herein, can be installed at any suitable location such as, for example, an indoor wall, an outdoor wall, a roof, a pillar, a floor, etc. For instance, such a tracking apparatus can be installed below a high raised floor (e.g., mounted to a high raised floor tile grid) in, for example, a data center.

Furthermore, the tracking apparatus can be operatively coupled to a control device (e.g., a server at a remote location) via a suitable connection (e.g., a wired and/or wireless connection). The tracking apparatus can receive configuration information, control commands, and/or instructions from the control device. The tracking apparatus can also send collected data or information (e.g., RFID data associated with an object, human, or animal being tracked) to the control device. In some embodiments, the control device can be operatively coupled to and control the operation of multiple tracking apparatuses, each of which is similar or identical to those shown and described herein. In some embodiments, the control device can include or be communicatively coupled to a centralized database that is used to collect and process data received from the tracking apparatus(es).

As used herein, a module can be, for example, any assembly and/or set of operatively-coupled electrical components associated with performing a specific function, and can include, for example, a memory, a processor, electrical traces, optical connectors, software (executing in hardware), and/or the like. As used herein, the singular forms "a," "an," and "the" include plural referents unless the context clearly dictates otherwise. Thus, for example, the term "an Auto ID read module" is intended to mean a single module or a combination of modules configured to automatically read and process data associated with a subject being tracked.

Figure 1:
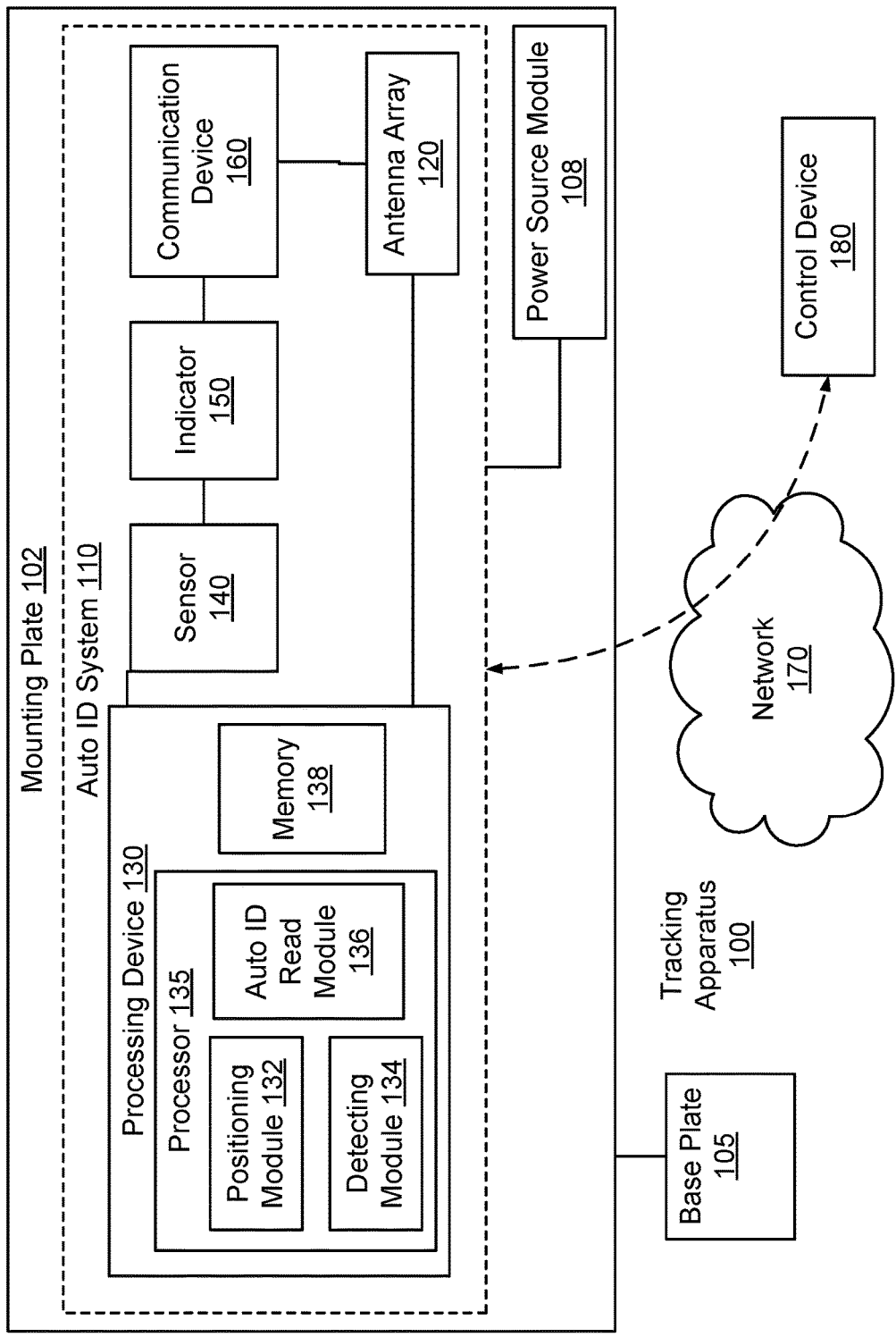
FIG. 1 is a schematic diagram that illustrates a tracking apparatus configured to perform a tracking operation, according to an embodiment.

FIG. 1 is a schematic diagram that illustrates a tracking apparatus 100 configured to perform a tracking operation, according to an embodiment. The tracking apparatus 100 includes a mounting plate 102 and a base plate 105, where the mounting plate 102 is operatively coupled to (e.g., mounted to) the base plate 105. The mounting plate 102 hosts or mounts an automatic identification (Auto ID) system 110 configured to perform the tracking operation. As described in detail below, such an Auto ID system 110 can be configured to perform the tracking operation by automatically and in real time (or near real time) collecting, reading, and processing data associated with a subject being tracked. In some instances, the Auto ID system 110 can implement one or more automatic identification and data capture (AIDC) technologies to automatically identify subjects, collect data about them, and enter that data directly into computer systems (i.e., without human involvement). AIDC technologies include, for example, barcodes, passive RFID (including LF (low frequency), HF (high frequency), UHF (ultra-high frequency), microwave, etc.), battery-assisted passive (BAP) RFID, active RFID (including LF, UHF, Wi-Fi, Bluetooth®, Zigbee®, ultrasound, infrared, UWB (ultra wide band), etc.), biometrics (e.g., iris and facial recognition system), magnetic stripes, optical character recognition (OCR), smart cards, voice recognition, surface acoustic wave (SAW)-based sensors, etc.

As shown in FIG. 1, the mounting plate 102 can also include a power source module 108 operatively coupled to the Auto ID system 110. The power source module 108 can be any device, component, or module configured to provide power to the components of the Auto ID system 110. Such a power source module 108 can include, for example, a device to generate power from renewable energy source(s) (e.g., solar, wind, heat differential from heating, ventilation, and air conditioning (HVAC) systems, etc.), battery, alternating current (AC) power cord, direct current (DC) power cable, and/or the like. The base plate 105 provides a base to the mounting plate 102 and attaches the tracking apparatus 100 to a fixed structure such as a ceiling, a wall, a floor, or the like. For example, as shown and described with respect to FIGS. 3 and 5, the base plate 105 can be mounted to a ceiling such that the tracking apparatus 100 can be used to track subjects (e.g., objects, humans, animals, etc.) that are located and/or move under the ceiling.

In an embodiment, the tracking apparatus 100 is operatively coupled to a control device 180 via one or more networks 170. The control device 180 can be any device that can be used to configure components of the Auto ID system 110 to control the tracking operation performed by the Auto ID system 110. Moreover, the control device 180 can receive data (e.g., RFID data and/or data derived from RFID data) from the tracking apparatus 100 and further process the received data. For example, the control device 180 can be a server, a workstation, a computing device, and/or the like.

In some embodiments, the control device 180 can include a tag data processing component such as, for example, a tag acquisition processor (TAP). In such embodiments, the control device 180 can be configured to store and execute software (e.g., intelligent algorithms of TAP) related to tag data processing. Some technologies related to TAP are disclosed in U.S. Pat. No. 7,667,572, filed on Jul. 29, 2005 and entitled "RFID Tag Data Acquisition System," U.S. Pat. No. 7,667,575, filed on Jul. 29, 2005 and entitled "Location Virtualization in an RFID System," U.S. Pat. No. 7,567,179, filed on Oct. 16, 2006 and entitled "Configuration Management System and Method for Use in an RFID System Including a Multiplicity of RFID Readers," International Patent Pub. No. WO/2006/015349, filed on Jul. 29, 2005 and entitled "RFID Tag Data Acquisition System," and International Patent Pub. No. WO/2007/047677, filed on Oct. 16, 2006 and entitled "Configuration Management System and Method for Use in an RFID System Including a Multiplicity of RFID Readers," all of which are hereby incorporated herein by reference in their entireties. Additionally, in some embodiments, the control device 180 can include or be associated (e.g., communicatively coupled) with a centralized database that is used to store some or all of the data received from the tracking apparatus 100.

As shown in FIG. 1, in some embodiments, the control device 180 can be operatively coupled to the tracking apparatus 100 via network(s) 170. Network(s) 170 can include any type of backhaul communication network that is configured to enable communication and data transmission between the control device 180 and the Auto ID system 110. The network(s) 170 can comprise a wired network (e.g., an Ethernet, local area network (LAN), etc.), a wireless network (e.g., a wireless local area network (WLAN), worldwide interoperability for microwave access (WiMAX), long term evolution (LTE) network, general packet radio service (GPRS) network, satellite and terrestrial network, etc.), or a combination of wired and wireless networks (e.g., mobile communication network, the Internet, etc.). For example, the control device 180 can be a server placed at a centralized location in a building and connected, via a local area network (LAN), to multiple tracking apparatuses (similar or identical to the tracking apparatus 100) that are distributed and installed at different locations (e.g., ceilings, floors, walls, etc.) within the building. As another example, the control device 180 can be a computing device located at a data center and operatively coupled, via a campus area network (CAN), to tracking apparatuses that are installed at multiple buildings. As yet another example, the control device can be a virtual server or a cloud server hosted within the Internet. In other embodiments, the control device 180 can be connected, using a wired or wireless connection (e.g., a serial connection, RS485 connection, CAN (controller area network) bus, fieldbus, etc., or any other suitable industrial communication standard), to the tracking apparatus 100 without using a network or intermediate device.

In the embodiment illustrated in FIG. 1, the Auto ID system 110 includes a processing device 130, a sensor 140, an indicator 150, a communication device 160, and an antenna array 120, each of which is attached to the mounting plate 102 and operatively coupled to each other (e.g., through the mounting plate 102). In some embodiments, the Auto ID system 110 can include more or less components as shown in FIG. 1. For example, the Auto ID system 110 can include more than one sensor, no sensor, more than one indicator, no indicator, etc.

The antenna array 120 can include a set of antennas of the same or different types that can be used to receive signals from RFID-enabled subjects (e.g., via a tracking transponder). Each of the antennas from the antenna array 120 can be attached to the mounting plate 102 using, for example, an articulating bracket. In some embodiments, the articulating bracket can be adjustable such that the positioning and orientation of the antenna connected to that articulating bracket can be adjusted. Additionally or alternatively, the antennas from the antenna array 120 can be self-learning, self-adaptive, and/or self-healing antennas that are configured to automatically learn from the environment and adapt its configurations (e.g., positioning and/or orientation) to meet one or more requirements and/or preferences of radio frequency (RF) transmission.

For example, antenna array 120 can be self-learning in that, if no reads are seen on specific antenna(s) or from specific direction(s), based on a current RF pattern of the antennas, then the system (e.g., processing device 130) can switch or move antenna(s) at random speed(s) or to random pattern(s) to optimize them for RFID reads. Additionally or alternatively, antenna array 120 can be self-adaptive in that the antenna(s) may change gain or polarization to adapt to a given zone based on reflections and multipath effects. Additionally or alternatively, the antenna array 120 may be self-healing, wherein the antenna(s) have special material properties that maintain the gain, tuning, and/or RF pattern of the antenna(s) based on the environment, temperature variations, etc.

The sensor 140 can be any type of sensor configured to detect a subject (e.g., an object, human, animal), such as, for example, a motion sensor, a temperature sensor, a vibration sensor, a sound sensor, and/or the like. The indicator 150 can be any type of device that, when activated, can display or present an indication. Such an indicator can be, for example, a light-emitting diode (LED) display, an alarm speaker, and/or the like. The communication device 160 can be any device configured to send data signals to and/or receive control signals from the control device 180. Such a communication device can include, for example, a data port, a wireless access point (WAP), a wireless modem (e.g., for satellite communication, GPS (global positioning system) communication, terrestrial communication, etc.), a Bluetooth® transceiver, and/or the like.

In an embodiment, the processing device 130 includes a processor 135, a memory 138, and/or other components (not shown in FIG. 1). The processor 135 may include a positioning module 132, a detecting module 134, an Auto ID read module 136, and/or other modules (not shown in FIG. 1). In some embodiments, although not shown in FIG. 1, the processor 135 can include a software-defined radio (SDR) module configured to implement a SDR system for the Auto ID system 110.

Each module in the processor 135 can be any combination of hardware-based module (e.g., a field-programmable gate array (FPGA), an application specific integrated circuit (ASIC), a digital signal processor (DSP)), software-based module (e.g., a module of computer code stored in the memory 138 and/or executed at the processor 135), and/or a combination of hardware- and software-based module. In an embodiment, each module in the processor 135 is capable of performing one or more specific functions associated with the tracking operation. In some embodiments, the modules included and executed in the processor 135 can be, for example, a process, application, virtual machine, and/or some other hardware or software module (stored in memory and/or executing in hardware). The processor 135 can be any suitable processor configured to run and/or execute those modules. For example, the processor 135 can include and/or execute a software-based and/or hardware-based (e.g., configured to execute software stored in hardware) module related to the self-learning, self-healing, and/or self-adapting process of the antennas from the antenna array 120. As another example, the processor 135 can include and/or execute a software-based and/or hardware-based (e.g., configured to execute software stored in hardware) module that stores received data (e.g., in the memory 138) when the connection between the Auto ID system 110 and the control device 180 is not reliable, and/or forwards the data to the control device 180 when a reliable connection is established.

In an embodiment, the positioning module 132 can be configured to adjust a position and orientation of each of and/or subsets of the antennas from the antenna array 120. For example, the positioning module 132 can send a signal to an articulating bracket such that the articulating bracket adjusts the position and/or orientation of the attached antenna. The detecting module 134 can be configured to, based on signals received from the sensor 140, detect a subject (e.g., an object, human, animal, etc.) and activate the antenna array 120 and the Auto ID read module 136. The Auto ID read module 136 can be configured to automatically, and in real time (or near real time), process data (e.g., RFID data) received from the antennas that track the subject, and then provide the processed data to the control device 180.

In some embodiments, the memory 138 can be, for example, a Random-Access Memory (RAM) (e.g., a dynamic RAM and/or static RAM), a flash memory, a removable memory, and/or so forth. In some embodiments, instructions associated with performing the tracking operation can be stored within the memory 138 and executed by the processor 135. In an embodiment, an instruction or command associated with adjusting the position of an antenna from the antenna array 120 can be received at the processing device 130 from the control device 180. The instruction can be stored in the memory 138 and executed by the processor 135. Specifically, the positioning module 132 can send a signal to the articulating bracket of the corresponding antenna, such that the position of that antenna is adjusted based on the instruction.

Figure 2:
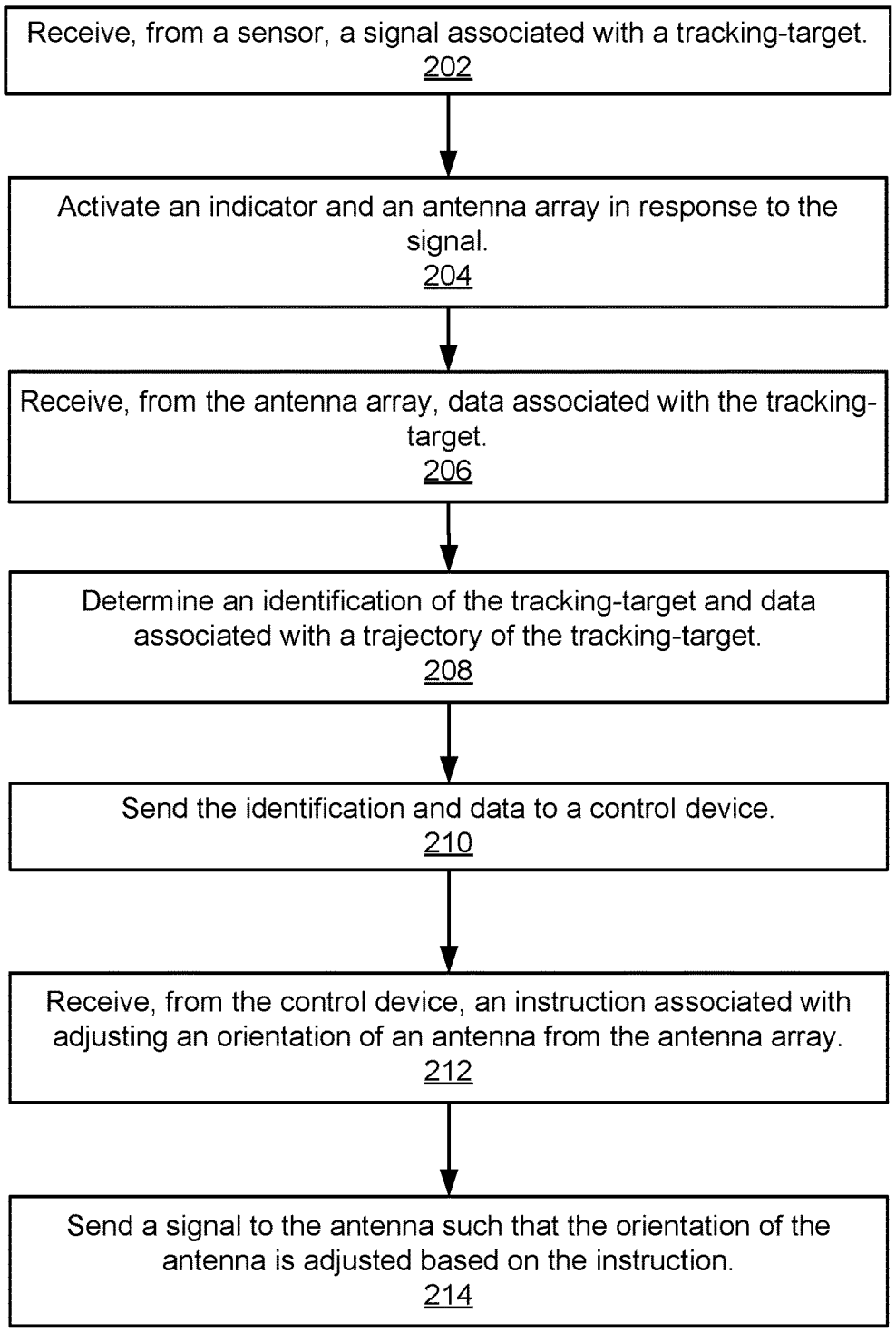
FIG. 2 is a flow chart illustrating a method for performing a tracking operation, according an embodiment.

FIG. 2 is a flow chart illustrating a method 200 for performing a tracking operation, according an embodiment. The code comprising instructions to perform the method 200 can be stored in, for example, a non-transitory, processor-readable medium (e.g., the memory 138 in FIG. 1) in a processing device (e.g., the processing device 130 shown and described with respect to FIG. 1). Particularly, the processing device can be included in an Auto ID system of a tracking apparatus, such as the tracking apparatus 100 shown and described with respect to FIG. 1. The tracking apparatus can be operatively coupled to a control device, such as the control device 180 shown and described with respect to FIG. 1. The code stored in the non-transitory, processor-readable medium (e.g., the memory 138 in FIG. 1) of the processing device can be executed by a processor of that processing device (e.g., the processor 135 in FIG. 1). The code includes instructions to be executed by the processor to cause the processing device to perform the operations illustrated in FIG. 2 and described below.

At 202, the processing device can receive, from a sensor (e.g., sensor 140 shown and described with respect to FIG. 1), a signal associated with a tracking target (e.g., an object, human, animal, etc.). The signal can be received at the processing device in response to the tracking target being detected by the sensor. For example, the tracking apparatus can be installed in, on, or at a ceiling (e.g., above the ceiling or below the ceiling) of a corridor in a hospital building. When a patient walks through the corridor, a motion sensor of the tracking apparatus can detect the movement of the patient, and then send a signal to the processing device of the tracking apparatus.

At 204, the processing device can activate an indicator (e.g., the indicator 150 in FIG. 1) and an antenna array (e.g., the antenna array 120 in FIG. 1) of the tracking apparatus in response to receiving the signal. Specifically, a detecting module (e.g., the detecting module 134 in FIG. 1) of the processing device can send signals to the indicator and the antenna array, such that the indicator and the antenna array are activated. As a result, the antenna array can be changed from a sleep mode to an operating mode, and an indication that the tracking is in operation can be displayed by the indicator. In the above example, in response to the signal received from the motion sensor, a detecting module (e.g., the detecting module 134) of the processing device can send a signal to activate the antenna array (e.g., the antenna array 120) such that the antennas from the antenna array start to track the patient. Meanwhile, the detecting module can send a signal to activate a blinking LED (e.g., indicator 150) to indicate that a tracking operation is in action.

At 206, the processing device can receive data associated with the tracking target from the antenna array. The received data can include RFID data retrieved from signals that are sent from, for example, a RFID tag (e.g., a passive RFID tag, an active RFID tag, a BAP RFID tag, etc.) attached to the tracking target (i.e., a subject, such as an object, human, animal, etc.). The RFID data can include, for example, data associated with the identification and/or status of the tracking target. The received data can also include or derive information that can be used to track the movement of the tracking target, such as signal strength and/or direction of the received data. In response to receiving the signals from the tracking target, the antennas from the antenna array can retrieve the RFID data from the signals, and then send the RFID data and other information to the processing device for further processing. Alternatively, the antennas can communicate the signals to the processing device, and the processing device may retrieve the RFID data from the signals. I In the above example(s), the tracking target may be a patient who is wearing a wristband that includes a RFID tag uniquely associated with that patient. Antennas from the antenna array can receive signals sent from the RFID tag, retrieve RFID data associated with the RFID tag from the received signals, and send the RFID data as well as other information and/or data of the received signals to the processing device.

At 208, the processing device can determine an identification and/or status of the tracking target and data associated with a trajectory of the tracking target. Specifically, an Auto ID read module (e.g., the Auto ID read module 136 in FIG. 1) of the processing device can read and analyze the RFID data, and then determine the identification and/or status of the tracking target based on the RFID data. Furthermore, the Auto ID read module (or another component or module of the processing device) can infer data associated with the trajectory of the tracking target based on the data received from the antenna array such as the signal strength, sampling rate, direction, phase, and/or time span of the signals received at the antennas. In the above example, an Auto ID read module of the processing device can identify the RFID tag of the patient based on the RFID data that is uniquely associated with the RFID tag. Thus, the patient can be identified. Furthermore, based on the data received at the processing device that is associated with the signals received at the antennas, the Auto ID read module can determine the trajectory of the patient as the patient walks through the corridor.

At 210, the processing device can send the identification of the tracking target and data associated with the trajectory of the tracking target to the control device for further processing. In some embodiments, a communication device (e.g., the communication device 160 in FIG. 1) of the tracking apparatus can be used to send the identification and data to the control device. For example, data associated with the identification and trajectory of the patient can be sent to a server at a surveillance room in the hospital building for further processing. Such a server can be operatively coupled to and control the operation of a set of tracking apparatuses that are distributed within the building.

At 212, the processing device can receive, from the control device, an instruction associated with adjusting an orientation of an antenna from the antenna array. In some embodiments, such an instruction can be defined by a closed-loop system that provides feedback to the antenna array based on a projected trajectory of a tracking target. Alternatively, antennas of the antenna array or other components (e.g., sensors) of the tracking apparatus can be manually adjusted or configured by, for example, a user of the tracking apparatus. As an example, a projected or inferred trajectory of the patient may show that the patient is approaching a boundary of coverage of the antenna array. Based on such a projected trajectory, the control device (e.g., as a part of the closed-loop system) can determine to adjust the orientation of one or more antennas from the antenna array such that the coverage of the antenna array is extended. The control device can then define an instruction for the adjustment, and send the instruction to the processing device of the tracking apparatus.

At 214, in response to receiving the instruction, the processing device can send a signal to the corresponding antenna, such that the orientation of the antenna is adjusted based on the instruction. Specifically, a positioning module (e.g., the positioning module 132 in FIG. 1) of the processing device can perform such an operation. In some embodiments, as shown and described with respect to FIGS. 1 and 4, the positioning module can send a signal to adjust an articulating bracket of the antenna or multiple articulating brackets for multiple antennas, such that the orientation of the antenna(s) are changed based on the instruction. For example, the processing device can send a signal to adjust the orientation of a corresponding antenna such that the tracking apparatus can continue tracking the patient.

Although described with respect to FIGS. 1 and 2 as a processing device of a tracking apparatus performing the operations 202-214, in other embodiments, a portion of those operations can be performed by other components or devices of the tracking apparatus or other devices. For example, a sensor of the tracking apparatus (e.g., motion sensor) can be configured to detect a subject and then activate an indicator and/or an antenna array without sending a signal to the processing device. As another example, a centralized data processing device operatively coupled to the tracking apparatus can be configured to process data collected by the tracking apparatus and determine the identification, status, and/or trajectory of the subject being tracked. In such a scenario, the tracking apparatus can send raw data (e.g., RFID data and/or other data associated with received signals) collected by the antennas to the data processing device without performing the processing operations as described at 208.

FIG. 3 is an assembly view (an isometric view) of a tracking apparatus 300, according to an embodiment. The tracking apparatus 300 can be structurally and functionally similar or identical to the tracking apparatus 100 shown and described with respect to FIG. 1. Specifically, the tracking apparatus 300 can include a mounting plate 10, one or more mounting brackets 14 (e.g., four mounting brackets 14), and/or a base plate 12. The mounting plate 10 can be mounted to the base plate 12. The mounting plate 10 is attached to an adjustable bottom panel, which is under the mounting plate 10 and not viewable in FIG. 3. As shown and described with respect to FIG. 4, the adjustable bottom panel of the mounting plate 10 includes an Auto ID system (e.g., the Auto ID system 110 shown and described with respect to FIG. 1). Additionally, although not shown in FIG. 3, the tracking apparatus 300 can be operatively coupled to and controlled by a control device (e.g., the control device 180 shown and described with respect to FIG. 1).

Without popping a ceiling tile, it can be very difficult to identify the available space for installation of a RFID read point. Space above the ceiling can be occupied by a building's structure, HVAC ducting, cable trays, plumbing, etc. Advantageously, to meet these stringent space requirements, the height of the ceiling-mounted apparatus, according to disclosed embodiments, can be adjusted on the spot without tools. This is made possible, for instance, by embodiments which utilize a slider mechanism with embossed measurements, such that the mounting brackets 14 (e.g., four mounting brackets 14) may be adjusted to the same or varying heights to meet the space requirements. These mechanisms may also improve human safety and efficiency for installers working at elevated heights (e.g., using a ladder or indoor scissor lift) to install the ceiling-mounted apparatus(es). Since, in some embodiments, no tools are needed to install the apparatus or adjust the height of the apparatus, the installer may keep one hand free to improve safety, for example, by allowing the installer to hold on to the ladder or a rail of the scissor lift.

Specifically, in such embodiments, the mounting brackets 14 may comprise a slider mechanism and a clip 14-4. As illustrated, the slider mechanism comprises a groove, slot, or track 14-1 through which a sliding element 14-2 fits and along which the sliding element 14-2 slides. The sliding element 14-2 is fixed to base plate 12 on one side of the track 14-1 and clampable or securable on the other side of the track 14-1 via a clamping or securing mechanism 14-3, such that the sliding element 14-2 may slide along the track 14-1 when unclamped and fixed at a position along the track 14-1 when clamped. For instance, the sliding element 14-2 may comprise a screw which is threaded through a through-hole on the base plate 12, opposite the track 14-1, and passed through the track 14-1 such that the threads of the screw extend beyond the track 14-1 on the side of the track 14-1 opposite the base plate 12. As illustrated, the securing mechanism 14-3 may comprise a clamping piece and a wing nut or similar element. The clamping piece contacts a surface of the mounting bracket 14 and surrounds the screw threads extending through the track 14-1. The wing nut can be tightened over the screw threads in the direction of the clamping piece to tightly press the clamping piece against the mounting bracket 14, thereby releasably or adjustably fixing the base plate 12 to the mounting bracket 14 (e.g., via the friction between the clamping piece and the mounting bracket 14 or other mechanism). Alternatively, the slider mechanism may comprise a push-to-release spring-loaded stopper, a combination of spring-loaded locking pins, or similar element(s), which may be, for example, received by any of a plurality of holes formed in the track 14-1 so as to fix the base plate 12 at a position along the track 14-1 corresponding to the hole. In an embodiment, mounting bracket 14 may be embossed or otherwise marked with measurements, to aid in the positioning of each of the mounting brackets 14 with respect to base plate 12. Thus, advantageously, using the slider mechanism and mounting brackets 14, the height of the tracking apparatus 300, which may be directly attached to base plate 12 or indirectly attached to base plate 12 via mounting plate 10, may be easily adjusted without any tools or with limited use of tools.

Furthermore, the mounting brackets 14 may each comprise a clip 14-4, which is configured to mount on standard ceiling tile grids. Thus, advantageously, the mounting brackets 14, along with the tracking apparatus 300 which may be directly attached to base plate 12 or indirectly attached to base plate 12 via mounting plate 10, can be easily installed on existing ceiling tile grids without any tools or with limited use of tools and without any modification to the ceiling tile grid. In addition, as discussed above, the height of the tracking apparatus 300 with respect to a ceiling tile, over which the tracking apparatus 300 has been placed, may be easily adjusted.

Figure 5:
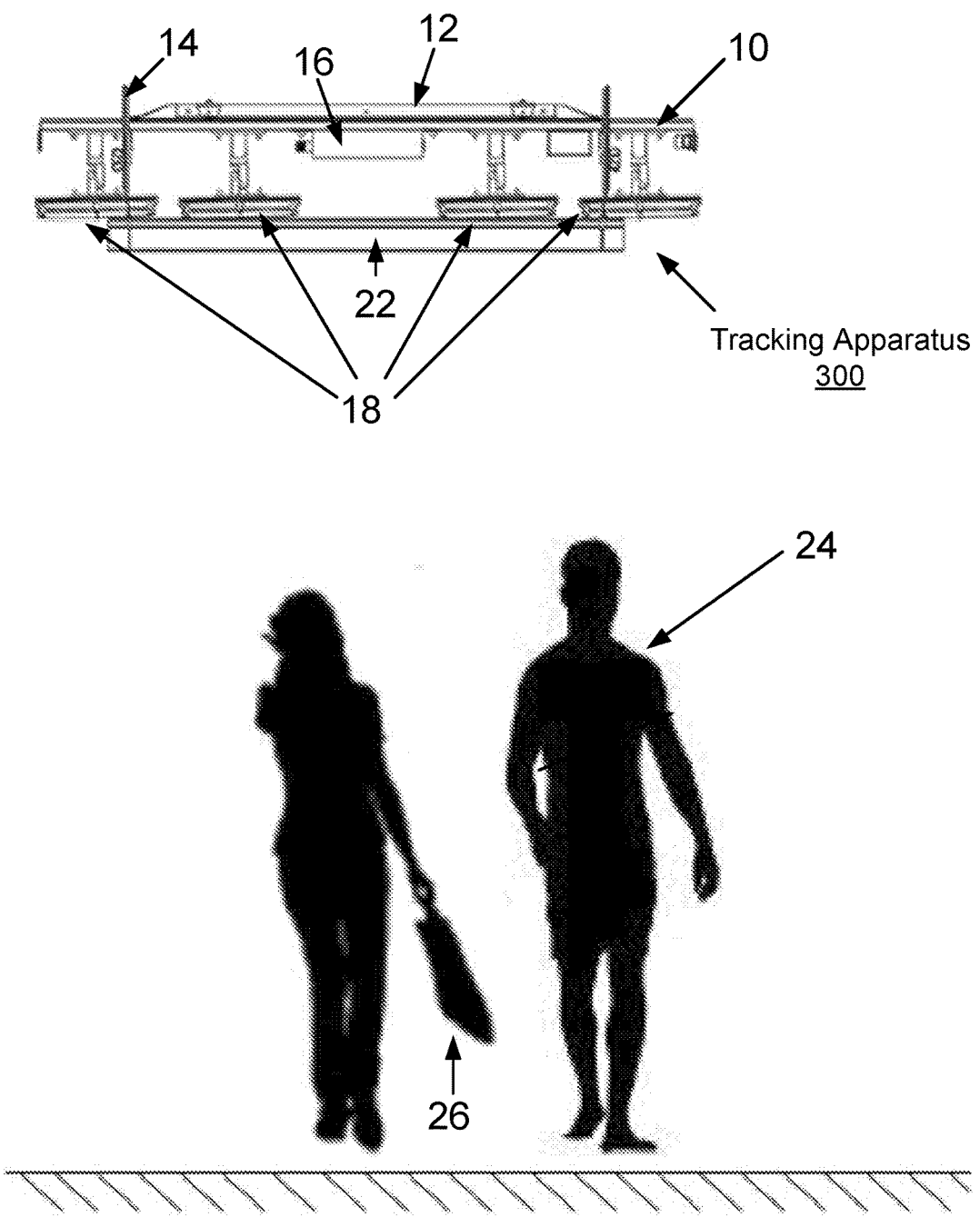
FIG. 5 is a view of the tracking apparatus in FIG. 3, situated above a ceiling and configured to track a RFID-enabled subject, according to an embodiment.

In some embodiments, the tracking apparatus 300 can be mounted to a ceiling in a substantially horizontal position (e.g., above a ceiling tile as shown in FIG. 5). As described herein, the use of ceiling-mounted tracking apparatuses (e.g., with the software and communication features described in the '014 Patent) allows RFID read points to connect to multiple antennas to create individual or combined zones. Advantageously, compared to wall-mounted RFID reader devices, this may reduce overall reader count for a given space by leveraging each antenna as a read point with multiple antennas/read points connected to a single RFID reader.

Specifically, as shown in FIG. 3, the base plate 12 can be attached to two mounting brackets 14 that can be connected, for example, to a support grid of the ceiling (e.g., as shown in FIG. 5). Alternatively, the mounting plate 10 can be directly mounted to the mounting brackets 14, in which case, the tracking apparatus 300 may not include the base plate 12. The mounting brackets 14 can be compatible with any type of ceiling rails. The tracking apparatus 300 can be mounted to a ceiling at a position above the ceiling, for example, to conceal the apparatus such that it cannot be seen from under the ceiling. Alternatively, the tracking apparatus 300 can be mounted to a ceiling at a position under the ceiling, for example, to minimize impact of dust on the tracking apparatus 300. In other embodiments, although not shown and described herein, the tracking apparatus 300 can be mounted at any other suitable location and/or with any other appropriate position. In such embodiments, the tracking apparatus 300 can operate and perform the tracking function in a similar or identical method as described herein. For example, the tracking apparatus 300 can be mounted to a wall of a room in a substantially vertical position to track subjects (e.g., objects, humans, animals) inside the room.

In some embodiments, the mounting plate 10 and the base plate 12 can be integrated together and attached using hardware (e.g., screws, actuators, grooves, cables) in such a way that the position or orientation of the mounting plate 10 can be altered to optimize or improve the performance of the Auto ID system of the tracking apparatus 300. For example, the distance between the mounting plate 10 and the base plate 12 can be adjusted such that the mounting plate 10 can be positioned at an appropriate height to provide optimized or improved signal strength for data transmissions. As another example, the mounting plate 10 can be rotated to a certain angle (e.g., rotated within a horizontal plane, rotated within a vertical plane, or rotated in any other suitable direction) with respect to the base plate 12 that is in a fixed position, to provide a different coverage for the tracking. Similarly, in other embodiments, the mounting plate 10 can be mounted, integrated, or attached to the mounting brackets 14 in an adjustable method such that the position or orientation of the mounting plate 10 can be altered to optimize or improve the performance of the Auto ID system of the tracking apparatus 300. Together, the mounting plate 10, the mounting brackets 14, and/or the base plate 12 can provide a method of anchoring via, for example, cable, hooks, or other anchoring methods.

FIG. 4 is a view of the adjustable bottom panel including the Auto ID system of the tracking apparatus 300, according to an embodiment. As shown in FIG. 4, the Auto ID system of the tracking apparatus 300 includes an antenna array 18, a RFID reader 16, and an accessory device 27 containing other components (e.g., sensor, indicator, communication device) of the Auto ID system. Each of the antenna array 18, RFID reader 16, and accessory device 27 is attached to the mounting plate 10. Furthermore, the antenna array 18, RFID reader 16 and the accessory device 27 are operatively coupled to each other via, for example, cables (e.g., at the other side of the mounting plate 10 and not viewable in FIG. 4).

As shown in FIG. 4, the antenna array 18 includes four antennas of the same type. Each of the four antennas is connected to an articulating bracket 20. The articulating brackets 20 are adjustable such that the position and/or directionality of the antennas can be changed to provide optimized or improved performance (e.g., coverage, read rate, signal strength, accuracy of tracking) of the Auto ID system. In some embodiments, the position and/or directionality of an antenna from the antenna array 18 can be manually adjusted by, for example, a user of the apparatus. In other embodiments, the position and/or directionality of the antenna can be automatically adjusted. For example, one or more of the articulating brackets 20 can be configured to receive an instruction from the control device and then make an adjustment to the position and/or directionality of the corresponding antenna based on the instruction.

The four antennas of the antenna array 18 can be collectively configured to track a subject (e.g., object, human, animal). In some embodiments, the antennas are positioned in a manner and/or their directionalities are adjusted to certain directions such that each antenna can cover a certain space with minimum overlap between coverage of the different antennas. For example, an antenna from the antenna array 18 can create an exclusion zone for the remainder of the antennas from the antenna array 18. In some embodiments, the antennas can have overlapped coverage. For example, an antenna from the antenna array 18 can create an inclusion zone for the remainder of the antennas from the antenna array 18. In such embodiments, the RFID reader 16 can be configured to process RFID data associated with the same subject that is collected by different antennas. Furthermore, in some embodiments, the antennas can be coordinated (e.g., by a processor of the tracking apparatus 300 or by the control device) to perform the tracking operation. For example, if a subject is within the coverage of two antennas, the two antennas can be coordinated to alternate in performing the tracking.

In an embodiment, each antenna in the antenna array 18 can be adjusted independently and/or as subsets in order to create one or more RFID zones. The antenna(s) can be adjusted (e.g., by adjusting corresponding articulating bracket(s)) through a variety of angles to provide such zones in virtually any direction. However, it should be understood that, it may be preferable to design the antennas such that they may be articulated to some subset of angles within a range of 0° to 180° with respect to an orthogonal axis to the surface to which they are mounted (e.g., ceiling, floor, wall) and may be rotated to some subset of positions within a range of 0° to 360° with respect to an axis that is parallel to the surface to which they are mounted. In this manner, each antenna or subset of antennas can be articulated towards any point (or virtually any point, depending on the design) on the side of the surface to which the tracking apparatus 300 is mounted.

In some embodiments, although not shown in FIG. 4, the antenna array 18 can include more or less than four antennas of the same or different types. In some embodiments, the mounting plate 10 can be coupled to one or more bulkheads such that the tracking apparatus 300 can be connected to one or more additional tracking apparatuses (e.g., similar or identical to the tracking apparatus 100 or 200 described herein) using the bulkhead(s) via, for example, coaxial cable or any other suitable connecting means. As a result, the size of the antenna array can be increased. Furthermore, in some embodiments, the mounting plate 10 can include devices or components used to add or couple antennas onto the mounting plate 10 such as, for example, multiplexer(s), power splitter(s), combiner(s), circulator(s), etc.

The RFID reader 16 can be any device configured to receive, process, and/or send RFID data. In some embodiments, the RFID reader 16 can be structurally and/or functionally similar to the processing device 130 shown and described with respect to FIG. 1. That is, the RFID reader 16 can include modules (e.g., software-based modules, hardware-based modules, or a combination of software-based and hardware-based modules) configured to perform functions unrelated to processing data (e.g., RFID data) such as, for example, detecting a subject (using a sensor), adjusting position or orientation of an antenna, etc. In other embodiments, the RFID reader 16 can be configured to solely process data (e.g., RFID data), and the other functions can be performed by other components, devices or modules (e.g., the accessory device 27) of the tracking apparatus 300.

Particularly, the RFID reader 16 can identify the subject being tracked by reading the RFID data sent from a RFID tag disposed with the subject. Specifically, the RFID reader 16 can be configured to receive RFID data that is collected by the antenna array 18, identify the subject being tracked based on the RFID data, determine data (e.g., location, speed, direction) associated with the subject based on the RFID data, and send the identifier and inferred data of the subject to the control device.

In some embodiments, one or more sensors, indicators, and/or communication devices of the tracking apparatus 300 can be embedded within the accessory device 27. In other embodiments, although not shown in FIG. 4, the sensor(s), indicator(s) and/or communication device(s) can be positioned and attached to the mounting plate 10 at separate locations. A sensor of the tracking apparatus 300 can be any type of sensor configured to detect a subject (e.g., an object, human, animal). For example, the tracking apparatus 300 can have a temperature sensor configured to detect a human based on a temperature of the human body that is higher than temperatures of the environment and surrounding objects. As another example, the tracking apparatus 300 can have a motion sensor configured to detect an object, human, and/or animal that moves at a speed higher than a threshold. For yet another example, the tracking apparatus 300 can have a sensor (e.g., smoke detector, odor sensor, etc.) configured to detect a dangerous situation (e.g., smoke, fire, poison gas, etc.) and then activate an indicator (e.g., an alarm siren, a flashing light, etc.) to signal subjects (humans, objects, animals) to evacuate (or to be evacuated). In such an example, the Auto ID system of the tracking apparatus 300 can be used to track and count the subjects being evacuated. In some embodiments, the tracking apparatus 300 can have more than one sensor of the same or different types to detect the same or different types of subjects.

In some embodiments, when no subject is detected by the sensor(s) of the tracking apparatus 300, the tracking apparatus 300 can operate in a sleep mode. For example, the antenna array 18 and the RFID reader 16 can be turned off or placed in an inactive status. When a subject is detected by the sensor(s), the tracking apparatus 300 can be changed from the sleep mode to an operating mode. For instance, a signal can be sent (e.g., from the sensor) to the antenna array 18 and the RFID reader 16 such that the antenna array 18 and the RFID reader 16 can be turned on or changed to an active status. Additionally, in some embodiments, a signal can be sent by the communication device(s) to the control device, such that an indication of the tracking being in operation can be sent to the control device and, in some embodiments, provided from the control device to an operator of the control device. Meanwhile, in an embodiment, a signal can be sent to an indicator(s) of the tracking apparatus 300 such that an indication of the tracking being in operation can be shown or presented. Such an indicator can be any type of device that can be used to display or present an indication such as, for example, a visual indicator, an audio indicator, and/or the like. For example, when a subject is detected, a light can be turned on, a beeping sound can be played, a blinking LED light can be activated, and/or an alarming siren can be triggered.

A communication device of the tracking apparatus 300 can be any device, component, or module configured to send data signals to and/or receive control signals from the control device. Such a communication device can include, for example, a WAP or a wireless modem operatively coupled to the control device via a wireless connection, a data port operatively coupled to the control device via an Ethernet connection, or a combination of wireless and wired connections. As described above, the communication device can be configured to send an indication of the tracking operation to the control device. Similarly, the communication device can be configured to send data (e.g., RFID data) or information provided by the RFID reader 16 to the control device, and/or receive configuration information (e.g., to configure the RFID reader 16) and/or control instructions (e.g., to adjust the position or orientation of the antenna array 18) from the control device. Additionally, the communication device can be used together with the RFID reader 16 to transmit detection signals and/or RFID data to the control device.

In some embodiments, the components of the Auto ID system of the tracking apparatus 300 can be powered by an external power source such as, for example, a wired connection (e.g., power over Ethernet (PoE)), an electrical outlet (connected via an electrical wire), and/or the like. Alternatively or additionally, the components of the Auto ID system can be powered by an internal component (not shown in FIG. 4) of the tracking apparatus 300 (e.g., the power source module 108 shown and described with respect to FIG. 1). Specifically, such an internal power source component can include, for example, a device to generate power from renewable energy source (e.g., solar, wind, heat, etc.), a battery, and/or the like. For example, a battery power source component can be installed and attached to the side of the mounting plate 10 opposite the side shown in FIG. 4.

FIG. 5 is a view of the tracking apparatus 300 situated above or within a ceiling and configured to track RFID-enabled subject, according to an embodiment. As shown in FIG. 5, the tracking apparatus 300 is mounted, via the two mounting brackets 14, to a ceiling support grid of the ceiling 22. In some embodiments, the tracking apparatus 300 can be mounted in a way such that the antenna array 18 can interact with minimal interference with the RFID-enable subject. In some embodiments, as discussed above, the tracking apparatus 300 can be mounted to a ceiling, a wall, a raised floor or other structure using any suitable technique (e.g., magnetic attachment, suction pads, pulley, drop cable, mounting bracket, etc.)

A tracking transponder can be used with, connected to, equipped with, or integrated with a subject to be tracked. For example, a tracking transponder can be attached to (or implanted into) a human's body (e.g., implanted into a human's shoulder as the tracking transponder 24 shown in FIG. 5, integrated with a wristband or a necklace, etc.). As another example, a tracking transponder can be integrated with (or connected to) an object (e.g., integrated with a purse as the tracking transponder 26 shown in FIG. 5, connected to a medical equipment, attached to a patient's file folder, etc.).

In some embodiments, the tracking transponder can include a RFID tag, which can be used to uniquely identify the subject associated with the tracking transponder. Such a tracking transponder can be configured to send signals containing RFID data associated with the RFID tag. The signals sent from the tracking transponder can be received by one or more of the antennas of the tracking apparatus 300. Thus, the RFID data associated with the RFID tag, and other data or information associated with the signals sent from the tracking transponder can be received at the RFID reader 16 from the antenna array 18. As a result, based on the RFID data associated with the RFID tag, the RFID reader 16 can identify the subject being tracked.

Furthermore, based on characteristics (e.g., signal strength, phase, frequency or pattern) of the received signals, the RFID reader 16 can determine information associated with the subject being tracked. For example, the location of an object (or equivalently, the distance between the object and the antenna) can be determined based on signal strength of the received signals. As another example, a speed or direction of a moving subject being tracked can be inferred based on a series of signals (e.g., can be sampled by the antenna) associated with that moving subject. In some embodiments, the RFID reader 16 can implement a tag data processing module (e.g., a TAP) to process received data and signals. In such embodiments, the RFID reader 16 can be configured to store (e.g., in a memory of the RFID reader 16) and execute software (e.g., by a processor of the RFID reader 16) related to tag data processing such as, for example, intelligent algorithms of TAP, as described in the '014 Patent. For instance, the tag data processing module may translate characteristics of the received signal into a location, distance, speed, trajectory, etc., by analyzing one or a combination of the following: (1) number of reads; (2) number of reads per antenna; (3) received signal strength indication (RSSI) captured by each antenna; (4) time of arrival or phase of a signal at each antenna; and (5) exclusion zones created (e.g., one antenna can generate an RF bubble that can serve as an exclusion zone for another antenna and vice versa).

The RFID reader 16 can then send the identification, data, and/or information obtained from the RFID-enabled subject (e.g., received from the tracking transponder via the antenna(s) 18) to the control device for further processing. In embodiments, such tracking transponders can be made in any suitable shape, size, model, and/or using any appropriate material, such that they can be used with different types of subjects (e.g., objects, humans, animals).

In some embodiments, a tracking apparatus (e.g., the tracking apparatus 300) can be equipped with or included in a closed-loop system that can provide feedback to the antenna array and/or the RFID reader of that tracking apparatus. The feedback can be associated with the configuration, orientation, or positioning of the antennas, and/or configuration or setting of the RFID reader. The feedback can be used to adjust the configuration, orientation, or positioning of the antennas and/or configure the RFID reader such that performance of the Auto ID system can be optimized or improved. The feedback can be used to modify operations of the tracking antennas and the RFID reader such as, for example, signal strength, phase, frequency band, duration, sampling rate, function associated with detecting a particular RFID tag, etc. In some embodiments, for example, when a subject being tracked moves to boundary of coverage of an antenna, feedback can be provided to adjust orientation of that antenna such that the antenna can keep track of the moving subject. For instance, this feedback may be used to determine a location, distance, speed, trajectory, etc. of the subject being tracked by analyzing one or a combination of the following: (1) number of reads; (2) number of reads per antenna; (3) received signal strength indication (RSSI) captured by each antenna; (4) time of arrival or phase of a signal at each antenna; and (5) exclusion zones created (e.g., one antenna can generate an RF bubble that can serve as an exclusion zone for another antenna and vice versa). This information about the location, distance, speed, trajectory, etc. of the subject can then be used to adjust the antenna(s), e.g., towards a direction along the trajectory of the subject being tracked.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. An apparatus for tracking a subject using radio-frequency identification (RFID), the apparatus comprising:
   an antenna array comprising a plurality of articulating brackets and a plurality of antennas, wherein each of the plurality of articulating brackets is configured to rotate a corresponding one of the plurality of antennas into a plurality of orientations within at least a subset of a range of 0° to 180° around at least one axis, and wherein each of the plurality of antennas is configured to receive an RFID signal from an RFID tag; and
   at least one processor that
      detects whether or not at least one tracking target is present, and,
      when the presence of at least one tracking target is detected,
         determines a distance between the at least one tracking target and the antenna array based on a strength of one or more signals received by the antenna array,
         determines a trajectory of the at least one tracking target based on the determined distance, wherein determining the trajectory of the at least one tracking target comprises determining the trajectory of the at least one tracking target based on one or more of a strength, sampling rate, direction, phase, and time span of the one or more signals received by the antenna array, and, based on the determined trajectory of the at least one tracking target, automatically controls a first articulating bracket of the antenna array to rotate a first antenna of the antenna array into a new orientation to continue tracking the at least one tracking target.

2. The apparatus of claim 1, wherein rotating the first antenna comprises changing a directionality of the first antenna to be directed towards the determined trajectory of the at least one tracking target.

3. The apparatus of claim 1, wherein determining the trajectory of the at least one tracking target comprises determining one or more locations of the at least one tracking target based on the strength of one or more signals received by the antenna array.

4. The apparatus of claim 1, wherein the one or more signals received by the antenna array comprise a plurality of signals, and wherein determining the trajectory of the at least one tracking target comprises determining a direction of the at least one tracking target based on the plurality of signals.

5. The apparatus of claim 1, wherein the one or more signals received by the antenna array comprise a plurality of signals, and wherein determining the trajectory of the at least one tracking target comprises determining a speed of the at least one tracking target based on the plurality of signals.

6. The apparatus of claim 1, wherein the at least one processor is configured to control the plurality of articulating brackets such that directionalities of the plurality of antennas form a plurality of zones.

7. The apparatus of claim 6, wherein two or more of the plurality of zones overlap.

8. The apparatus of claim 1, further comprising one or more sensors that detect one or more environmental conditions.

9. The apparatus of claim 8, wherein the one or more environmental conditions comprise a presence of the at least one tracking target, and wherein the at least one processor detects whether or not the at least one tracking target is present based on at least one signal, indicating the presence of the at least one tracking target, received from the one or more sensors.

10. The apparatus of claim 1, further comprising a communication device configured to communicate with an external control device.

11. The apparatus of claim 10, wherein the communication between the communication device and the external control device comprises wireless communication.

12. A method for tracking a subject using an antenna array comprising:

detecting whether or not at least one tracking target is present; and, when the presence of the at least one tracking target is detected, determining a distance between the at least one tracking target and the antenna array based on a strength of one or more signals received by the antenna array, determining a trajectory of the at least one tracking target based on the determined distance, and, based on the determined trajectory of the at least one tracking target, automatically controlling a first articulating bracket of the antenna array to rotate a first antenna of the antenna array into a new orientation, within at least a subset of a range of 0° to 180° around at least one axis, to continue tracking the at least one tracking target, wherein determining the trajectory of the at least one tracking target further comprises determining the trajectory of the at least one tracking target based on one or more of a strength, sampling rate, direction, phase, and time span of one or more signals received by the first antenna and a second antenna of the antenna array.

13. The method of claim 12, further comprising controlling a plurality of articulating brackets such that directionalities of a plurality of antennas of the antenna array form a plurality of zones.

14. The method of claim 13, wherein two or more of the plurality of zones overlap.

15. The method of claim 12, wherein rotating the first antenna comprises changing a directionality of the first antenna to be directed towards the determined trajectory of the at least one tracking target.

16. The method of claim 12, wherein determining the trajectory of the at least one tracking target comprises determining one or more locations of the at least one tracking target based on the strength of one or more signals received by the antenna array.

17. The method of claim 12, wherein the one or more signals received by the antenna array comprise a plurality of signals, and wherein determining the trajectory of the at least one tracking target comprises determining a direction of the at least one tracking target based on the plurality of signals.

18. The method of claim 12, wherein the one or more signals received by the antenna array comprise a plurality of signals, and wherein determining the trajectory of the at least one tracking target comprises determining a speed of the at least one tracking target based on the plurality of signals.

* * * * *